United States Patent [19]
Burson

[11] 4,179,634
[45] Dec. 18, 1979

[54] MAGNETO ROTOR CONSTRUCTION

[75] Inventor: Bob O. Burson, East Longmeadow, Mass.

[73] Assignee: R. E. Phelon-Company, Inc., East Longmeadow, Mass.

[21] Appl. No.: 911,898

[22] Filed: Jun. 2, 1978

[51] Int. Cl.$^2$ .............................................. H02K 28/22
[52] U.S. Cl. .................................. 310/153; 310/156; 123/149 R
[58] Field of Search .................... 310/70 R, 70 H, 152, 310/153, 168, 159, 156, 261, 74, 216–218, 42; 123/149 R, 149 A, 149 D

[56] References Cited

U.S. PATENT DOCUMENTS

| | | | |
|---|---|---|---|
| 1,095,118 | 4/1914 | Keller-Dorian | 310/70 R |
| 2,516,901 | 8/1950 | Morrill | 310/156 |
| 2,652,504 | 9/1953 | Pinter | 310/42 |
| 2,866,912 | 12/1958 | Williamson | 310/156 X |
| 2,907,903 | 10/1959 | Reijnst et al. | 310/156 |
| 2,945,138 | 7/1960 | Strang | 310/153 |
| 3,072,813 | 1/1963 | Reijnst et al. | 310/156 |
| 3,265,913 | 8/1966 | Irwin | 310/153 |
| 3,581,394 | 6/1971 | Phelon | 310/156 |
| 3,657,582 | 4/1972 | Phelon | 310/156 |
| 3,663,850 | 5/1972 | Phelon | 310/218 X |
| 3,828,212 | 8/1974 | Harkness et al. | 310/153 |
| 3,979,617 | 9/1976 | Thom | 310/168 |
| 4,012,651 | 3/1977 | Burson | 310/153 |

Primary Examiner—Donovan F. Duggan
Attorney, Agent, or Firm—Chapin, Neal & Dempsey

[57] ABSTRACT

Rotor for a magnetomotive device in the form of an annular casting having a cavity or slot formed in the periphery thereof. The cavity includes locating surfaces. A permanent magnet is held in clamping relation within said cavity between a pair of pole pieces which include arcuate pole faces coaxial with the rotor. Retaining pins disposed in registered recesses of the cavity and pole pieces hold said pole pieces in said slot and urge surface portions thereof radially against said locating surfaces which are oriented to cause the pole pieces to exert clamping forces against the magnet disposed therebetween with the pole faces disposed in coaxial relation in the rotor.

7 Claims, 8 Drawing Figures

U.S. Patent    Dec. 18, 1979    Sheet 1 of 2    4,179,634
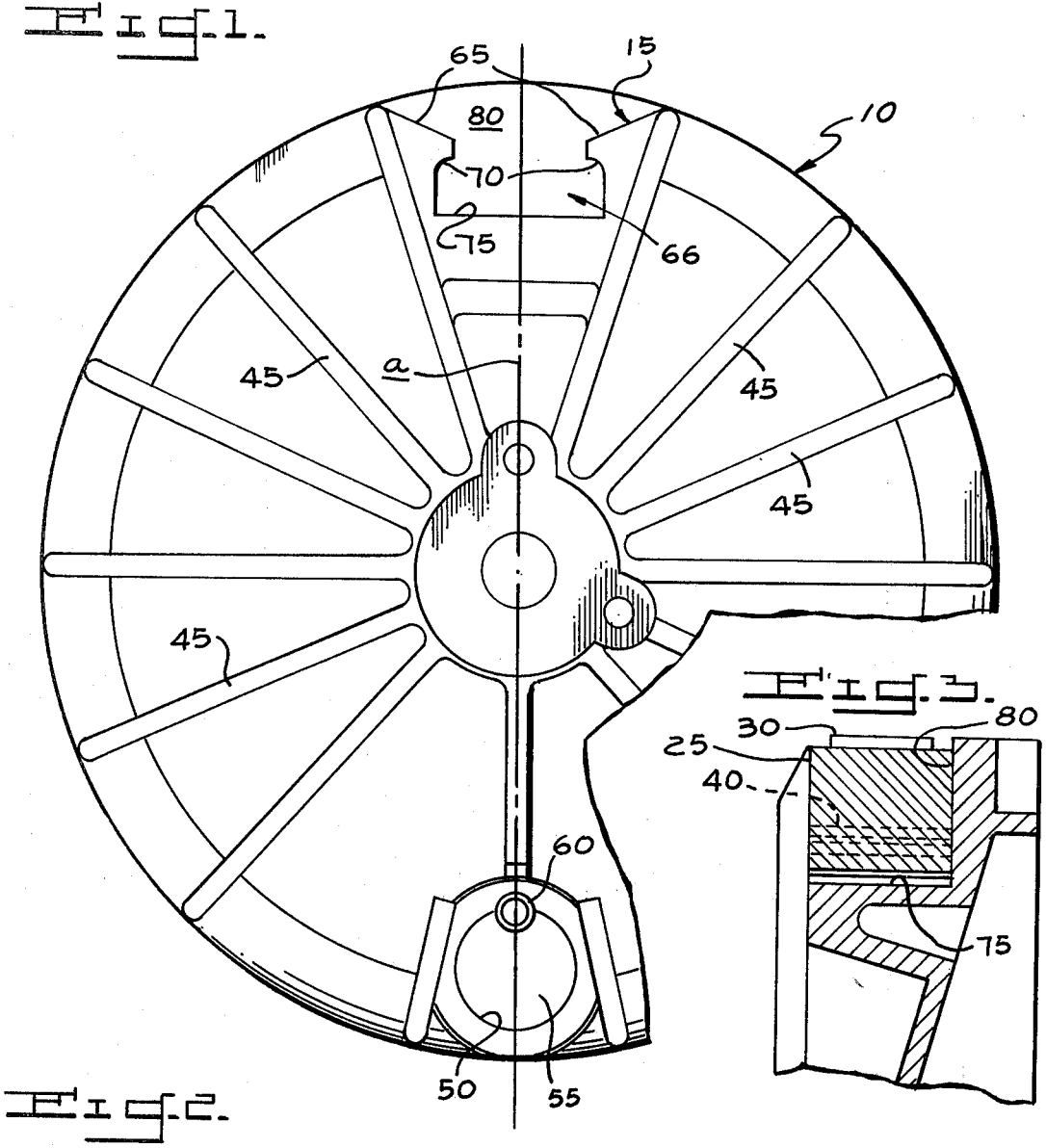
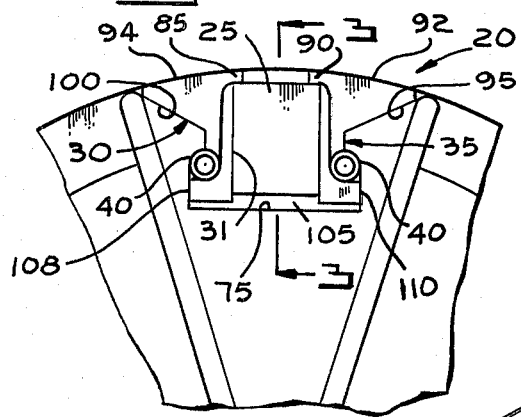
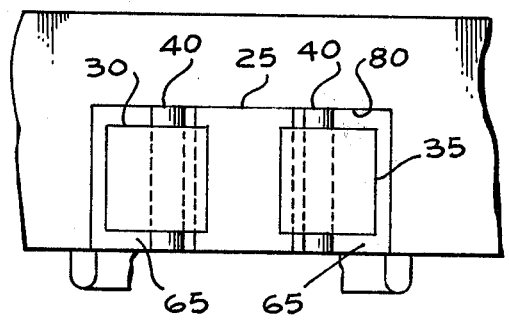
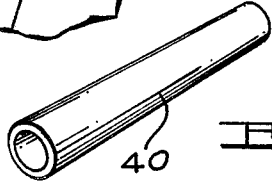

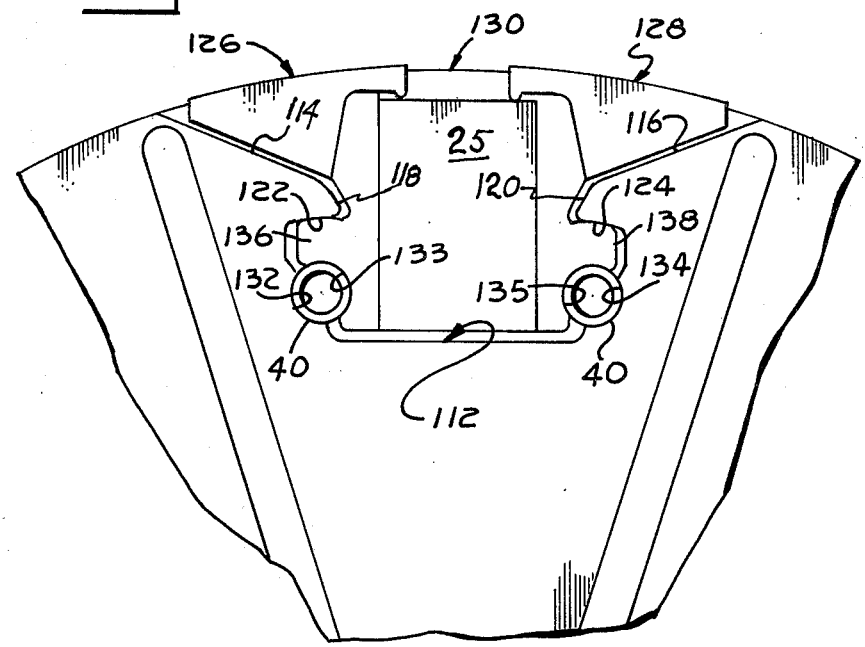
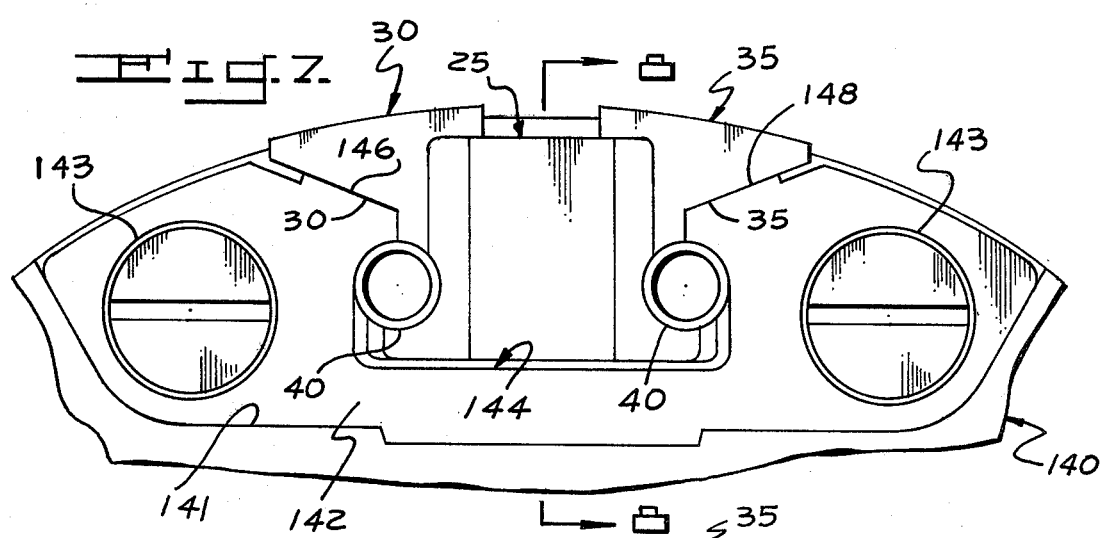
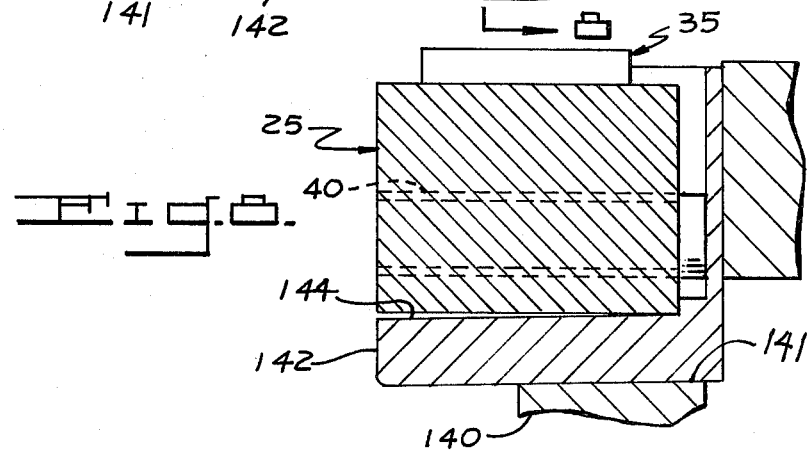

MAGNETO ROTOR CONSTRUCTION

BACKGROUND

Magnetos are widely used as ignition spark generators in small internal combustion engines and commonly employ permanent magnets carried by a rotor as a source of magnetic flux. In many such constructions, the magneto rotor also serves as the engine flywheel and generally, one or more permanent magnets is embedded within the rim of the flywheel and each magnet is disposed between a pair of pole shoes formed of ferromagnetic material which serve to provide a suitable magnetic flux path. Prior art methods of mounting permanent magnets and pole shoes in magneto flywheel rotors include the casting of the magnet and pole shoe group directly into the flywheel body. It has also been proposed to affix the magnet and pole shoe group to the rotor by fasteners such as screws or by the use of bonding agents. In addition, preformed rotor laminates have been used which are stacked or built up about the magnet pole shoe group.

In the mass production of such magnetomotive devices, the casting of each rotor about a pole shoe magnet group usually requires the use of die inserts for properly positioning the magnet and pole shoe members within the casting. In addition, a machine finishing operation is usually needed to insure that the pole shoes will be flush with the rotor periphery. As is well recognized, such operations add significantly to the cost factor of the magnetos. It will also be appreciated that stacked rotor constructions are very costly and labor intensive. The use of fasteners and adhesives for affixing pole shoe groups onto rotors do not generally afford sufficient structural integrity and are unsuited to mass production techniques and also require periodic maintenance checks.

Accordingly, it is a principal object of the present invention to provide a magneto rotor with improved mounting of a permanent magnet and pole shoe assembly which overcomes the drawbacks of the prior art structure.

Another object of this invention is to provide a magneto construction which lends itself to automated die-casting techniques much faster and more economical than casting procedures involving the use of inserts heretofore used in fabricating magnetos.

It is yet another object of the present invention to provide a rotor construction of the above type whereby after assembly of the magnet group and rotor, machining operations are unnecessary.

It is a further object of the present invention to provide a rotor casting combined with permanent magnet and pole shoe group characterized by utmost ease of assembly, structural integrity and durability.

DESCRIPTION OF THE DRAWINGS

These and other objects will become more readily apparent from the following detailed description taken in connection with the accompanying drawings in which:

FIG. 1 is a plan view of a magneto rotor adapted to receive a permanent magnet and pole shoe assembly in accordance with the present invention;

FIG. 2 is a fragmentary view showing the rotor and permanent magnet and pole shoes in assembled relation;

FIG. 3 is a sectional view taken along line 3—3 of FIG. 2;

FIG. 4 is a top view of the mounting assembly shown in FIG. 3;

FIG. 5 is a perspective view of a retaining pin of the type which may be employed in the rotor assembly embodying the present invention;

FIG. 6 is a view similar to FIG. 2 showing a modified form of this invention;

FIG. 7 shows another alternate embodiment of the invention; and

FIG. 8 is a section taken along line 8—8 of FIG. 7.

DETAILED DESCRIPTION

Referring to the drawings, a flywheel rotor of a magneto is shown generally at 10 and includes a cavity or slot 15 provided in the periphery of the rotor. The stator portion of the magneto (not shown) may be of any suitable construction such as shown in Piteo U.S. Pat. No. 3,484,677. The cavity is configured to receive therein a permanent magnet 25 disposed in clamped relation between a pair of circumferentially spaced pole shoe members 30 and 35. This assembly is locked in place on the rotor flywheel by a suitable retaining means which as shown comprises a pair of spring metal tubular pins 40.

While in the embodiment shown, the rotor 10 also serves as the engine-flywheel, it will be recognized that the invention may be adapted to the rotor of any magnetomotive device. Rotor 10 is preferably formed of any metallic material of suitable strength which includes the slot or cavity 15, as described above, and a plurality of ribs 45. The rotor may be an integral casting of nonferrous metal such as aluminum or zinc or a composite rotor of ferrous metal with a nonferrous insert in which the cavity 15 is provided. Additionally, the rotor casting is preferably formed with slot or cavity 50 opening in one axial direction and being adapted to receive and retain therein a counterweight 55 which as shown is locked in place by a locking pin 60 or other suitable fastener means. Counterweight 55 is selected for balancing the diametrically opposite magnet and pole shoe assembly.

Cavity or slot 15 is defined by a pair of locating surfaces 65 oriented for the proper positioning of the pole pieces on the rotor. In the embodiment shown, the surfaces 65 are accurately cast with inclined converging surfaces, and the angles of inclination are equal. The cavity 15 is further defined by an inner cavity of greater circumferential width than the inner ends of inclined surfaces 15 so as to form recesses or undercut shoulders 70. As shown, the bottom or inner surface 75 of the cavity 66 is generally perpendicular to the radius of the flywheel which corresponds to the plane of symmetry of the slot 15. Cavity or slot 15 may extend axially through the rim of the flywheel or, as shown in FIGS. 3 and 4, open only in one axial direction, in which case the slot is further defined by a back wall 80. The cavities 15 and 50 are symmetrical about a plane containing diameter a of the flywheel.

Permanent magnet 25 which as shown is in the form of a cubical block ceramic magnet which provides a strong source of magnetic flux for inducing an electric current in the coil of the stator for producing an ignition spark. Magnet 25 is disposed between a pair of identical ferromagnetic pole shoes 30 and 35 in clamped relation therebetween. The pole shoes are preferably powdered metal castings of identical configurations and serve to provide a desired magnetic flux path to interact with the core of an ignition coil (not shown). The pole shoes are cast with uniform planar inner surfaces 31 which are adapted to engage the side surfaces of permanent magnet or surface-to-surface contact. By not using a laminated pole shoe construction, any tendency to damage the surface of the magnet is eliminated. The pole shoes include shoulders 85 and 90 adjacent the upper edge of the surfaces 31 for engaging the outer edge portions of the magnet for the positive retention thereof against outward displacement resulting from centrifugal force caused by rotation of the rotor. Pole shoes 30 and 35 are provided with cylindrical or arcuate outer surfaces 92 and 94 which are coaxial or concentric with the periphery of the rotor. Each pole shoe is accurately cast to include undersurfaces 95 and 100 adapted to engage one of the locating surfaces 65 of rotor cavity 15. As best seen in FIGS. 2 and 3, the radial dimension or height of the pole shoes is less than the overall depth of the cavity 15, thereby defining a clearance 105 at the bottom of the cavity. Clearance 105 allows for inward adjustment of the pole pieces and magnet when these components are fitted into the cavity 15 and as the retaining pins 40 are inserted in the slots or apertures defined between the concave undersurfaces of shoulders 70 and the opposed concave upper surfaces of toe portions 108 and 110, registered therewith. As shown in FIG. 4, the outer radial portions of the pole pieces are of reduced axial thickness for economy of material and to minimie the weight of the magnet pole shoe assembly and also the mass of counterweight 55 required for balancing the rotor.

As best illustrated in FIG. 5, each retaining or locking pin comprises a tapered tubular member preferably formed of a suitably resilient material such as spring steel which will be tensioned when inserted in the axially extending cylindrical apertures defined between the shoulders 70 and registered recesses of toe portions 108 and 110. The pole pieces, magnet 25, locking pins 40 and slot 15 are dimensionally interrelated so that when these components are fitted together in the cavity, the locking pins will be diametrically compressed when driven into retaining position whereby, as shwon in FIG. 2, the cylindricl outer surfaces of the pole shoes will be accurately located in coaxial relation with the rotor. Any magneto air gap adjustment of the magneto stator relative the periphery of the flywheel may be accomplished in assembly. When driven into place, the retaining pins 40 each exerts a force against the abutting pole shoe radially directed toward the center of the flywheel. Since each pole shoe is engaged with inclined locating surfaces 65, the pole shoe surfaces 31 and shoulders 85 and 90 are urged to exert surface-to-surface clamping forces against the magnet, thereby firmly holding the magnet and pole shoes in the slot 15 and with the arcuate surfaces 92 and 94 in coaxial relation in the rotor. By this arrangement, the pole shoe assembly is accurately positioned and securely fastened in fixed position on the rotor. It will be recognized that this installation is achieved without costly fixtures and equipment and complex assembly techniques.

In FIG. 6 is shown a modified form of this invention wherein a cavity 112 is cast in the periphery of a flywheel of non-ferrous metal. The cavity includes inwardly inclined surfaces 114 and 116 terminating in circumferentially spaced shoulder portions 118 and 120. The undersurface of these shoulders form locating surfaces 122 and 124 oriented to cause pole pieces 126 and 128 into clamping engagement with permanent magnet 25 as a result of the forces exerted by retaining pins 40 which may be the same as shown in FIGS. 2 and 5. In this embodiment, the locating surfaces are inclined oppositely to slope the locating surfaces shown in FIG. 1 embodiment. The side walls of the cavity 112 are recessed as at 132 and 134 to accommodate the pins 40.

The permanent magnet 25 is clampingly retained between pole pieces 126 and 128 generally similar to the pole pieces 92 and 94 heretofore described. In this embodiment, the pole pieces each includes axially extending limbs or ribs 136 and 138 whose upper edge is adapted to engage locating surfaces 122 and 124. The pole pieces each include a semi-circular recess 133 and 135 below the limbs 136 and 138 which upon assembly of the components define with recesses 132 and 134 axially extending cylindrical slot or aperture to receive the retaining pins 40. The pins 40 are stressed so as to urge the pole shoes 126 and 128 radially outward of the cavity 112 whereby the tapered locating surfaces 122 and 124 cause inwardly directed clamping forces to be exerted by the pole shoes on the magnet 25. The locating surfaces are accurately die cast as are the limbs or ribs 136 and 138 so that in assembled relation the arcuate outer surfaces of the pole shoes 126 and 128 are coaxial with the center of the rotor.

In FIGS. 7 and 8 is shown another alternate embodiment of this invention. In this embodiment is shown a rotor 140 in the form of a ferrous metal casting in which is provided an outwardly opening cavity or recess 141. Disposed within this recess is a nonferrous insert such as an aluminum casting 142. The insert is affixed to the rotor by axially extending screws 143 and includes a cavity 144 which as shown may be of generally the same configuration and size as the cavity 15 illustrated in FIG. 1 whereby the same magnet and pole shoes may be used in this construction. The cavity includes inclined locating surfaces 146 and 148 which cooperate with magnet 25, pole shoe members 30 and 35 and retaining pins 40 in the same manner as described in connection with the embodiment shown in FIGS. 1-4.

The embodiment shown in FIG. 7 enables the use of cast iron rotor with a nonmagnetic insert whereby the magnet 25 and pole shoes 30 and 35 are sufficiently spaced from the ferromagnetic material of the rotor so that the flux will be confined and not dissipated in the ferrous rotor. Once the insert is affixed to the rotor 140, the further assembly of the components may be carried out in the same manner as for the embodiments shown in FIG. 1 and FIG. 6.

In assembly of the rotor of the present invention, the permanent magnet and pole shoes are simply clasped together and fitted into the cavity formed in the rim of the rotor. To insure that the outer surfaces of the pole shoes are properly positioned in coaxial relation with the flywheels, a simple fixture may be used having an internal radius selected to provide the desired coaxial orientation of the pole shoes on the flywheel. Ample clearance is provided between the pole shoe components and the walls of the slot so that the assembly can be quickly and easily carried out. The retaining pins, preferably tapered, are then driven, narrow end first, into the apertures or slots formed between the opposed registeed concave recesses provided in the cavity and pole shoes. The retaining pins are thus radially compressed and exert sufficient radially directed spring forces to cause the pole shoes to exert inwardly directed clamping forces against the permanent magnet whereby the assembled components are held in fixed relation on the flywheel even during high speed rotation of the flywheel.

While a number of embodiments of the permanent magnet mounting structure of the present invention have been shown, it will be appreciated that further modifications may be made in this structure without departing from the concept of this invention and it is intended by the appended claims to cover such modifications. In this connection, for example, instead of providing separate retaining pins, ribs may be formed on the pole shoe members so that on engagement with wall portions of a rotor cavity, the pole shoes will be urged by the locating surfaces of the cavity into clamping relation with the permanent magnet.

Having thus described the invention, what is claimed is:

1. Rotor for a magnetomotive device comprising an annular rotatable body having a cavity defined by non-magnetic material in the rim thereof including locating surfaces, a permanent magnet and circumferentially spaced pole shoes disposed in said cavity, said pole shoes being disposed in clamping relation with said magnet and each pole shoe having an arcuate surface and other portions engaged with said magnet and said locating surfaces, and means for retaining said pole shoes in said clamping relation with said permanent magnet within said cavity and for urging said pole shoes radially against said locating surfaces which are oriented to cause said pole shoes to exert clamping forces against said magnet while said arcuate surfaces are held in coaxial relation in said rotor.

2. Rotor for magnetomotive devices as set forth in claim 1 in which said retaining means comprises stressed members disposed in axially extending apertures formed between wall portions of said cavity and said pole shoes.

3. Rotor for magnetomotive devices as set forth in claim 1 in which said rotor is a casting of ferrous metal with a peripheral recess, a nonferrous insert carried by said rotor within said recess, said insert being provided with said cavity adapted to receive said permanent magnet and pole shoes therein.

4. Rotor for magnetomotive devices as set forth in claim 1 in which each of said locating surfaces is located on opposite sides of the centerline of said cavity and disposed at an oblique angle thereto whereby the pole shoes engaged with said locating surfaces are urged by said retaining means toward said centerline.

5. Rotor for a magnetomotive device as set forth in claim 2 in which said retaining members comprise spring steel tubular pins.

6. Rotor for a magnetomotive device as set forth in claim 5 in which said annular rotatable body is an integral casting and in which each of said pole shoe members are powder metal castings, each of said pole shoes including a cylindrical surface and an inclined surface disposed in engagement with one of said locating surfaces, said pole shoes also including circumferentially extending shoulder portions which engage the upper outer edge portions of said magnet for positive retention thereof against outward displacement resulting from the centrifugal force caused by rotation of said rotor.

7. Rotor for a magnetomotive device as set forth in claim 6 in which said rotor casting includes a second cavity disposed diametrically opposite the first cavity and a counterweight disposed in said second cavity for balancing the weight of said pole shoes and permanent magnet, said first cavity and second cavity having a common plane of symmetry containing a diameter of said rotor.

* * * * *